(12) United States Patent
Cheung et al.

(10) Patent No.: US 8,011,803 B2
(45) Date of Patent: Sep. 6, 2011

(54) LED AUTOMOTIVE FOG LAMP

(75) Inventors: Chi Fai Cheung, Hong Kong (HK); Sandy To, Hong Kong (HK); Wing Bun Lee, Hong Kong (HK); Jin Bo Jiang, Hong Kong (HK); Wen Kui Wang, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 20 days.

(21) Appl. No.: 12/399,167

(22) Filed: Mar. 6, 2009

(65) Prior Publication Data

US 2010/0226143 A1    Sep. 9, 2010

(51) Int. Cl.
*F21V 5/00* (2006.01)

(52) U.S. Cl. .................. 362/244; 362/309; 362/311.02

(58) Field of Classification Search .................. 362/236, 362/237, 241, 244, 245, 249.02, 296.1, 297, 362/298, 308–310, 311.01, 311.02, 311.07, 362/475, 485, 507, 509, 520, 521, 522, 538, 540, 543, 545

See application file for complete search history.

(56) References Cited

U.S. PATENT DOCUMENTS

| | | | | |
|---|---|---|---|---|
| 4,767,172 | A * | 8/1988 | Nichols et al. | 385/146 |
| 6,819,506 | B1 * | 11/2004 | Taylor et al. | 359/726 |
| 7,513,642 | B2 * | 4/2009 | Sormani | 362/245 |
| 7,670,038 | B2 * | 3/2010 | Schug et al. | 362/507 |
| 2004/0233655 | A1 * | 11/2004 | Zimmerman et al. | 362/19 |
| 2008/0043466 | A1 * | 2/2008 | Chakmakjian et al. | 362/237 |
| 2009/0268166 | A1 * | 10/2009 | Chen et al. | 353/20 |

* cited by examiner

*Primary Examiner* — Hargobind S Sawhney
(74) *Attorney, Agent, or Firm* — George G. Wang; Wilkinson & Grist

(57) ABSTRACT

A fog lamp may include a Lambertian LED, a collimating lens encompassing the Lambertian LED, a collimating surface including a total internal reflective surface and encompassing the collimating lens, and a corrugated surface attached to the collimating surface at an acute angle with respect to an optic axis of the corrugated surface.

20 Claims, 11 Drawing Sheets

LED AUTOMOTIVE FOG LAMP

BACKGROUND

Lighting systems for automotive vehicles may include lighting and signaling devices mounted or integrated to the front, sides and/or rear of the vehicles. These systems typically are designed to provide illumination for drivers to operate the vehicles after dark and to increase the visibility of the vehicles.

Vehicle lighting systems may include fog lamps. Fog lamps may provide a wide beam of light with a sharp cutoff at the top, and are generally aimed and mounted low. The fog lamps are intended to increase the illumination directed towards the road surface in conditions of poor visibility such as rain, fog or snow. Fog lamps may be used in place of dipped-beam headlamps for reducing the glareback from fog or snow.

While traditional automotive fog lamps use tungsten-halogen filament light sources, light emitting diodes (LEDs) have become frequently used in automotive lamps such as fog lamps. LED fog lamps may offer longer service life and better vibration resistance than traditional automotive fog lamps. However, challenges exist in the use of LEDs in automotive lighting devices due to the relatively low flux output of the LEDs. Moreover, even though high power LEDs may output around 80 to 100 lumens, the output flux may be unstable and may decline rapidly, unless good thermal management of the LED can be maintained.

It is therefore desirable to develop LED fog lamps with an enhanced flux output and efficiency. It is also desirable to develop automotive lighting systems that may provide improved durability, reliability, power consumption efficiency, size efficiency, natural coloring scheme, and design flexibility.

SUMMARY

According to one aspect, a fog lamp may include a Lambertian LED, a collimating lens encompassing the Lambertian LED, a collimating surface including a total internal reflective surface and encompassing the collimating lens, and a corrugated surface attached to the collimating surface at an acute angle with respect to an optic axis of the corrugated surface.

According to another aspect, a method of making a fog lamp system may include providing a Lambertian LED, encompassing the Lambertian LED with a collimating lens, encompassing the collimating lens with a collimating surface, and attaching a corrugated surface to the collimating surface at an acute angle with respect to an optic axis of the collimating surface.

DETAILED DESCRIPTION

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

Figure 1A:
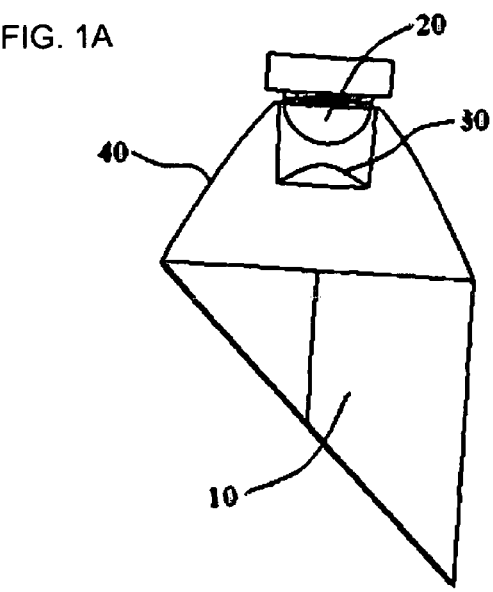
FIG. 1A depicts a side view of an LED automotive fog lamp.
Figure 1C:
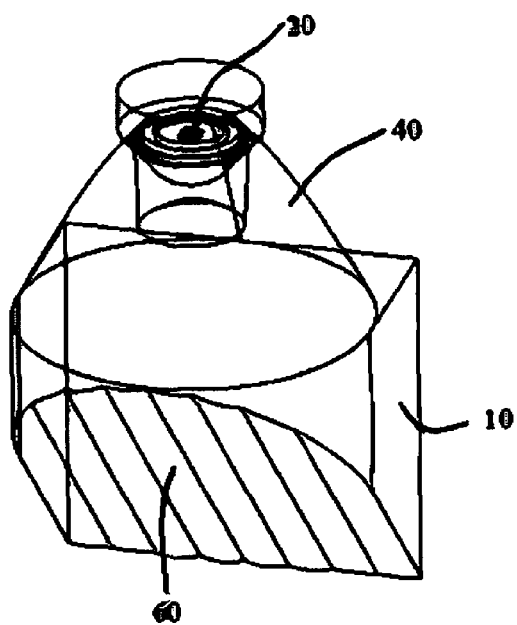
FIG. 1C depicts a back perspective view of the fog lamp of FIG. 1A.
Figure 1B:
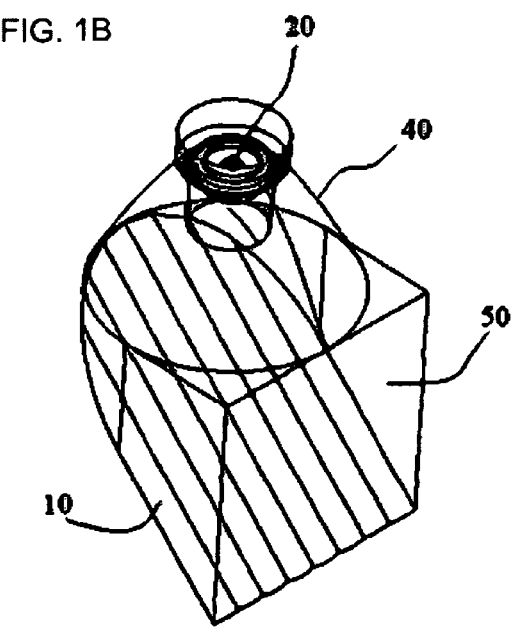
FIG. 1B depicts a front perspective view of the fog lamp of FIG. 1A.

The fog lamp system 10 may include a Lambertian LED 20, a collimating lens 30 encompassing the Lambertian LED 20, a collimating surface 40 including a total internal reflective surface and encompassing the collimating lens 30, and a corrugated surface 60 attached to the collimating surface 40 at an acute angle with respect to an optic axis of the collimating surface 40, as depicted in FIGS. 1A to 1C.

Figure 4A:
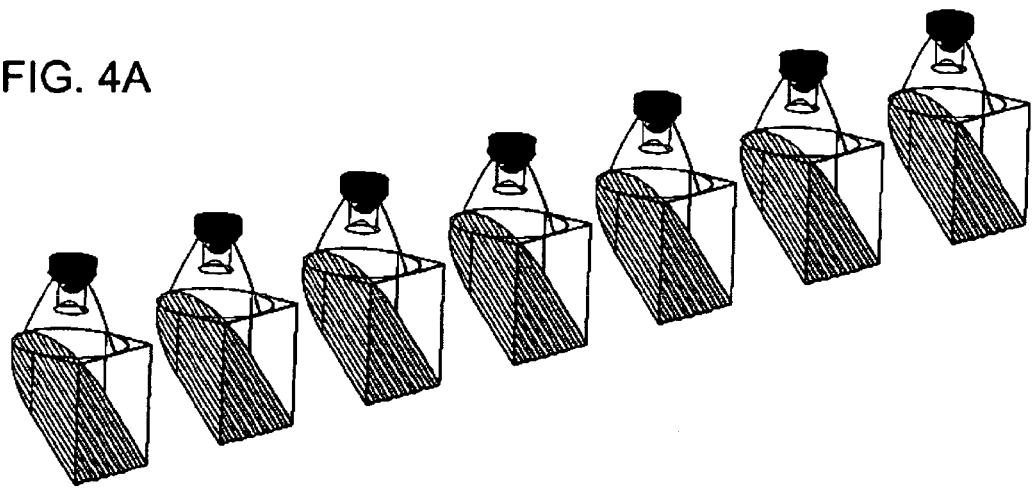
FIG. 4A depicts the front perspective view of a series of fog lamps.
Figure 4B:
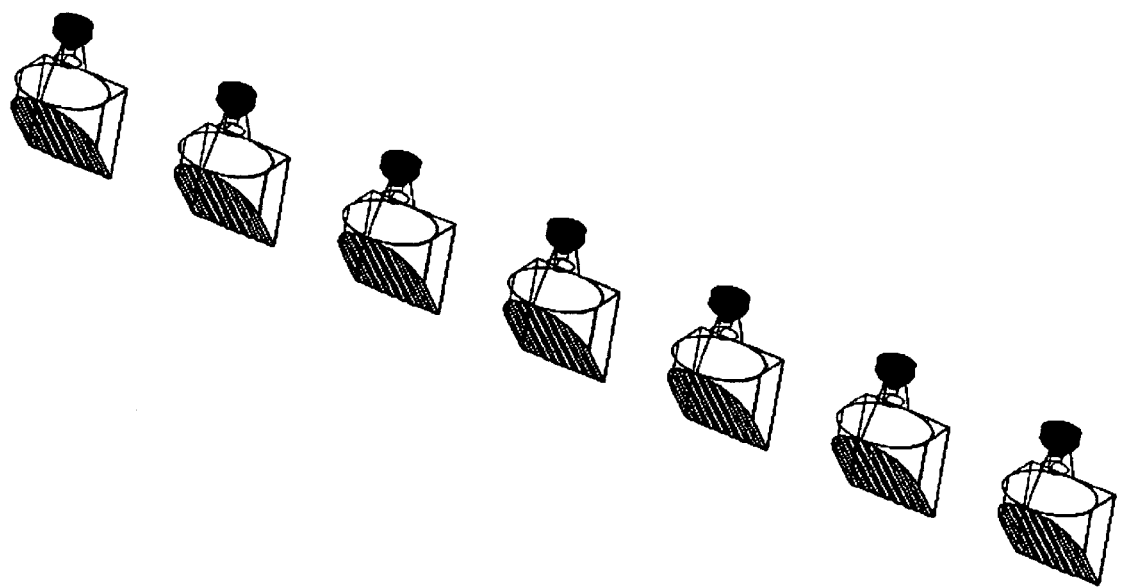
FIG. 4B depicts the back perspective view of a series of fog lamps.
Figure 5A:
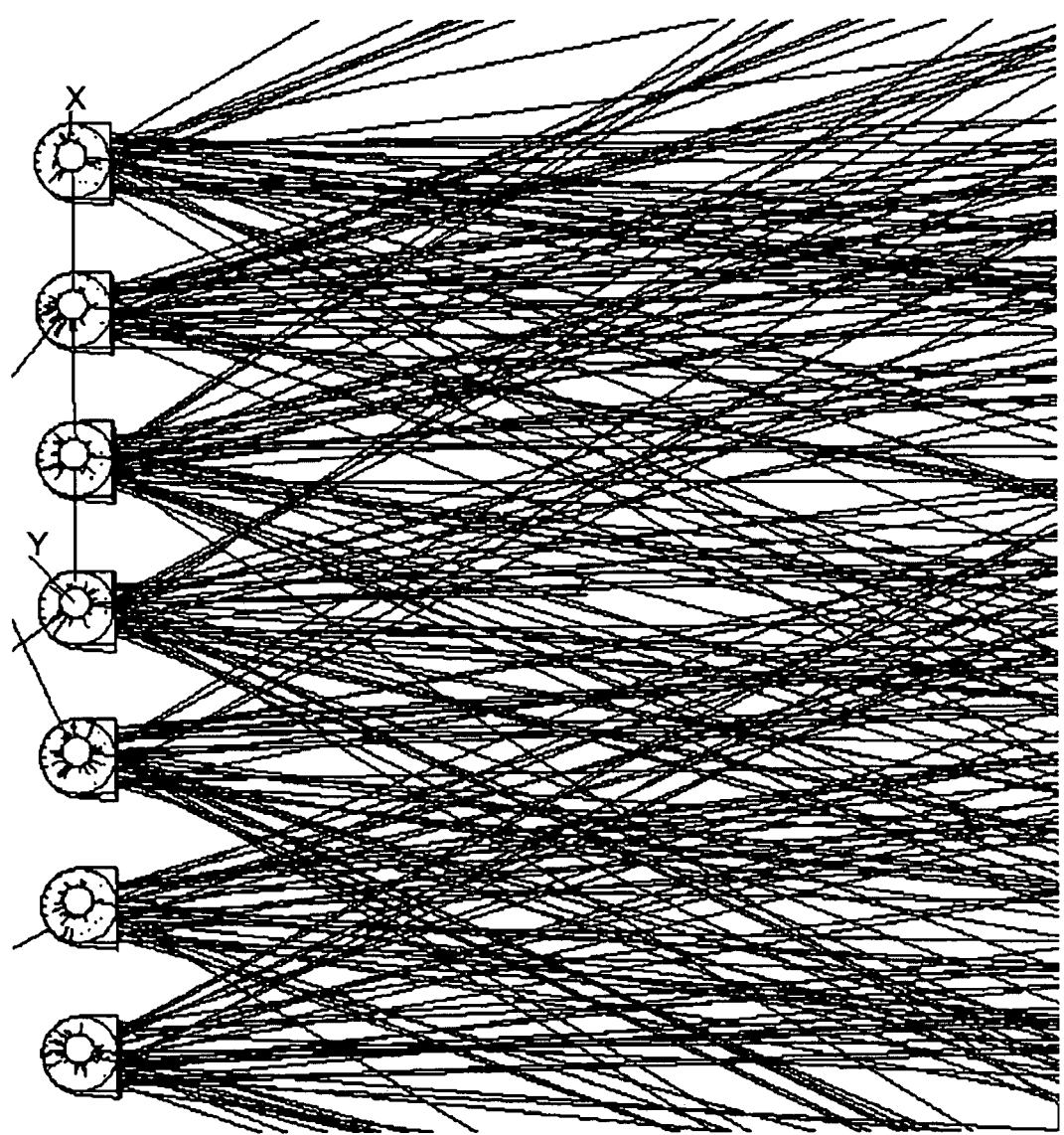
FIG. 5A depicts a top view of the series of fog lamps with light emission.
Figure 5B:
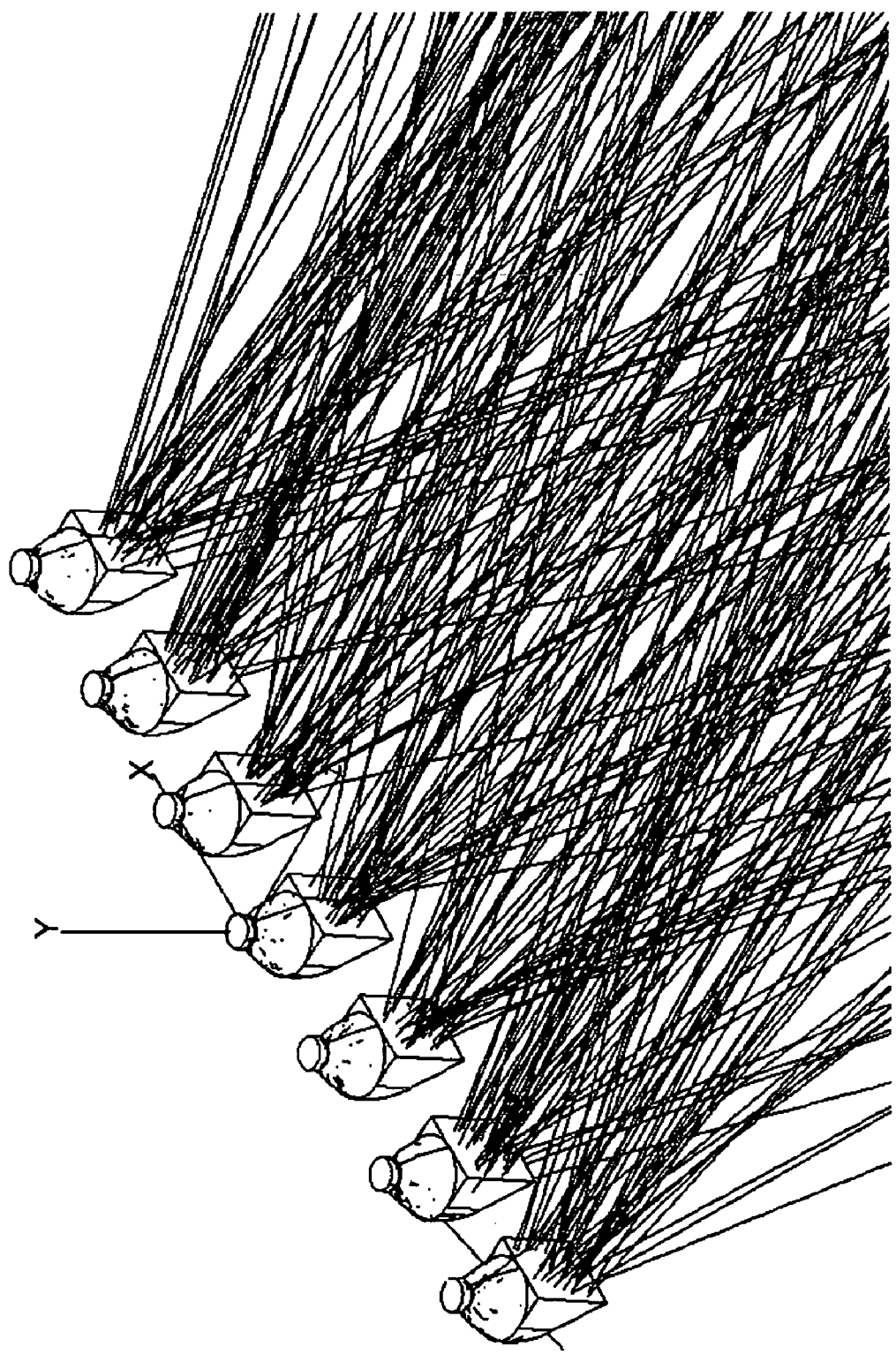
FIG. 5B depicts a front perspective view of the series of fog lamps with light emission.
Figure 5C:
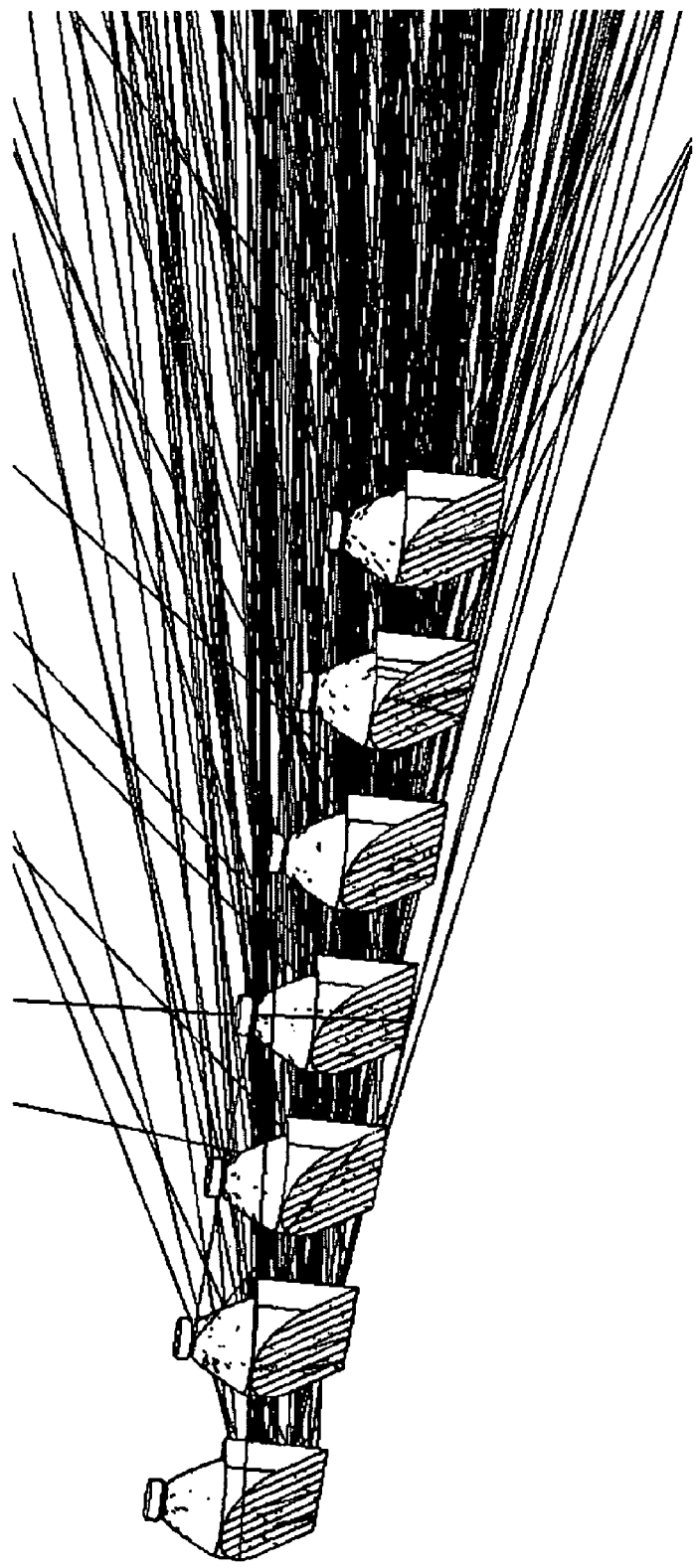
FIG. 5C depicts a back perspective view of the series of fog lamps with light emission.
Figure 5D:
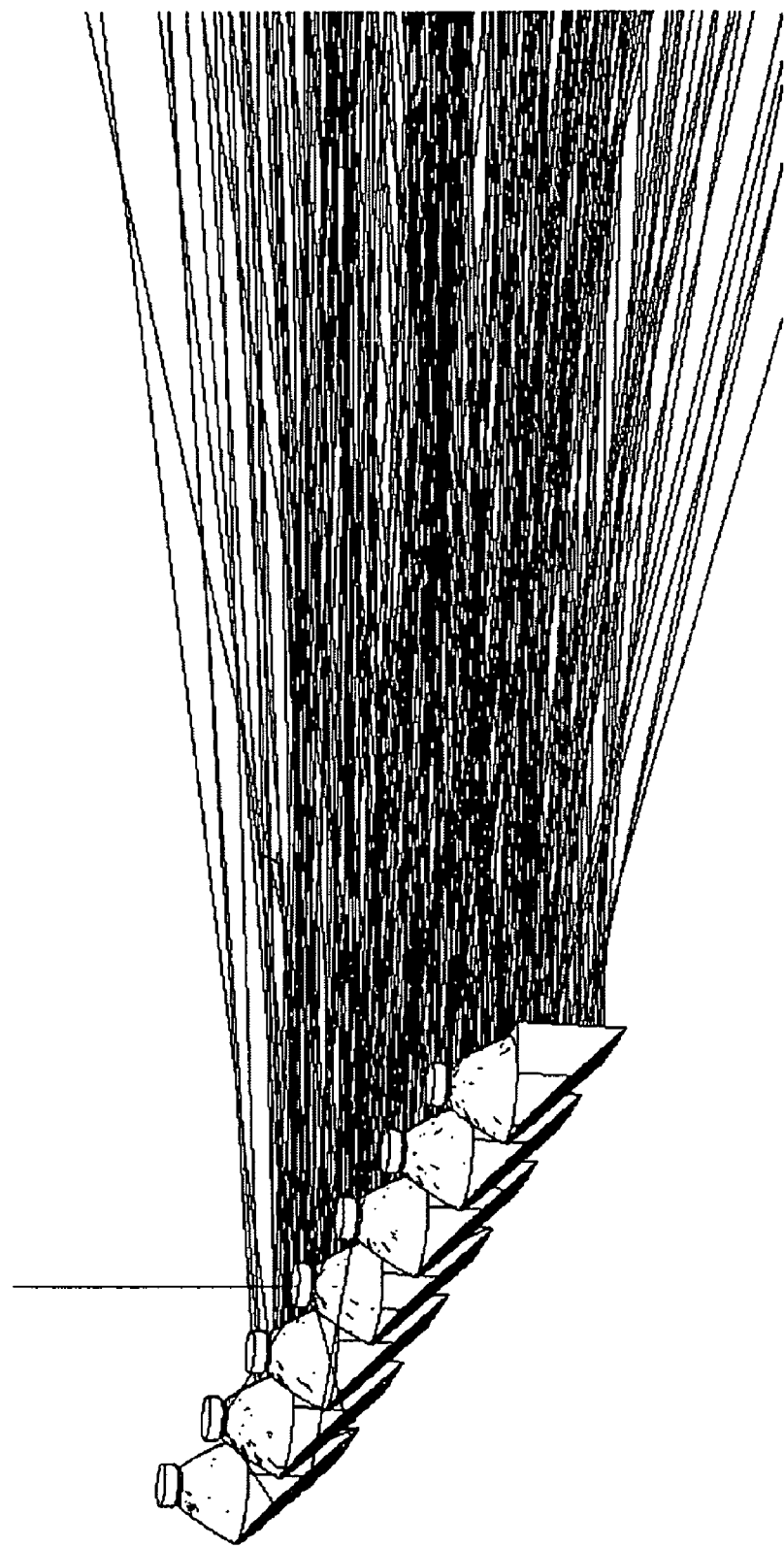
FIG. 5D depicts the side perspective view of the series of fog lamps with light emission.

The term "collimating lens" means a lens or a lens system that can make light rays substantially parallel as they exit the lens or lens system. The collimating lens 30 may collimate a central part of the light as emitted from the Lambertian LED 20. The term "collimating surface" means a plane or curvature that can make light rays substantially parallel as they exit the plane or curvature. The collimating surface 40 may collimate a remaining part of the light that may have missed the collimating lens 30. The term "corrugated surface" means a plane or curvature formed into winkles or folds or into alternating ridges or grooves. Examples of a corrugated surface may include a pillow lens array. The corrugated surface 60 may collect and direct the collimated light out of the fog lamp system 10. A fog lamp system may include a series of fog lamps, as depicted in FIGS. 4A and 4B. The system may meet the Economic Commission for Europe Inland Transport Committee standard for automotive front fog lamps, Regulation No. 19 (ECE Regulation).

The Lambertian LED 20 may include a flux of about 40 to 50 lumens, which may provide a low thermal deposit and a stable output flux. For example, the Lambertian LED 20 may have a flux of 42 lumens. Other lumen flux known to one of ordinary skill in the art may also be used. The LED may be any of a variety of colors. For example, the LED may be white or yellow.

Figure 2A:
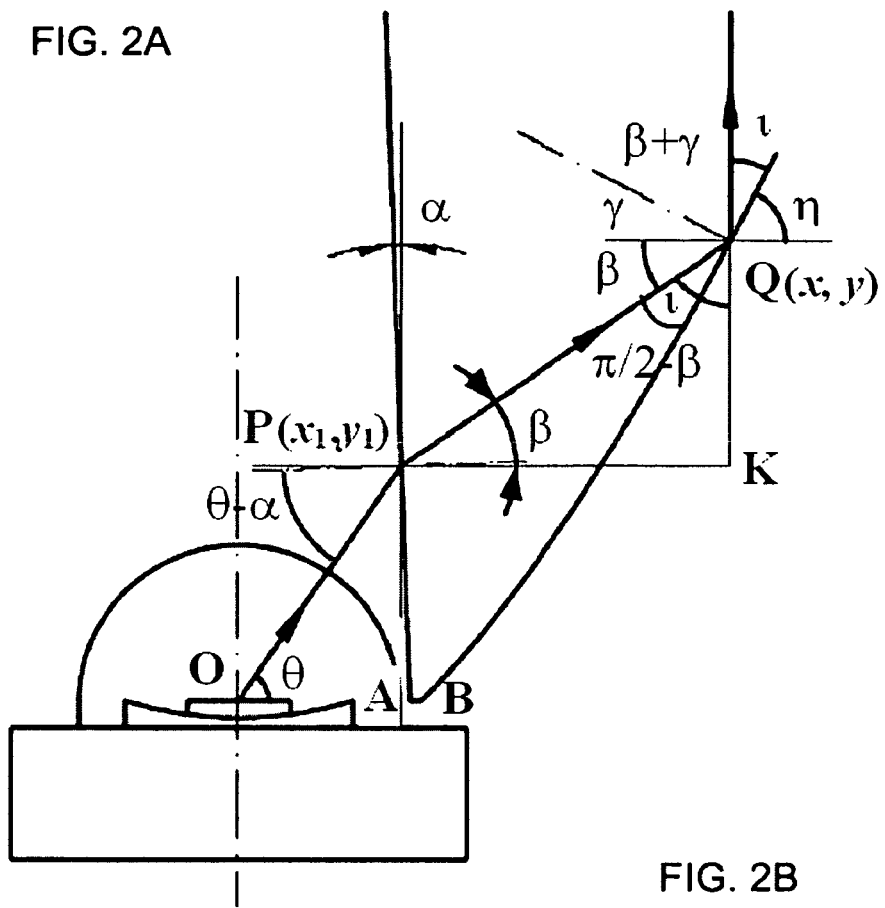
FIG. 2A depicts a schematic diagram of the light emission path of the LED fog lamp of FIG. 1A.
Figure 2B:
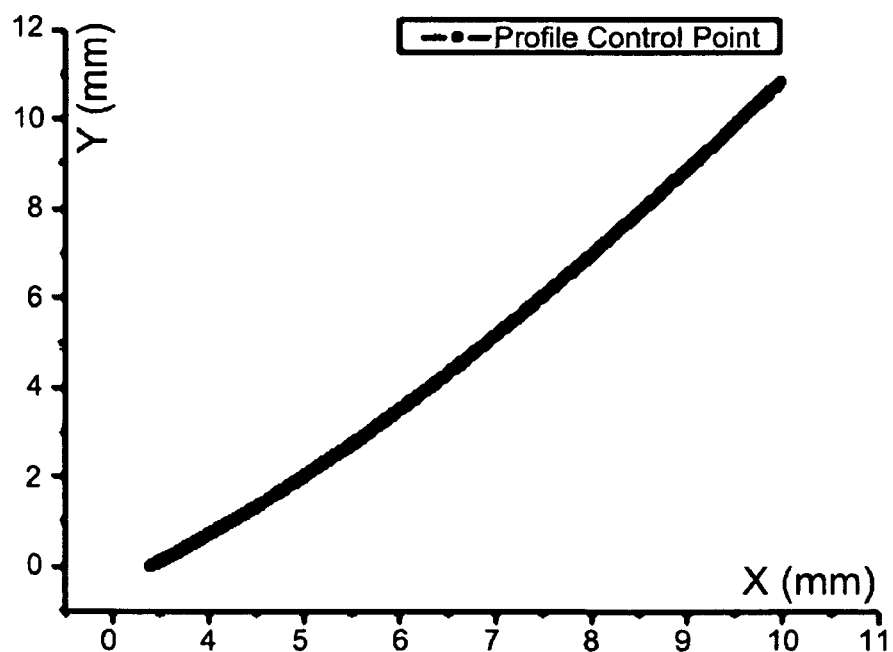
FIG. 2B depicts a graph of a mathematically calculated profile of a total internal reflective surface.

While not bound by theory, the term "Lambertian LED" means an LED that obeys Lambert's cosine law. Lambert's cosine law may be defined as the radiant intensity being directly proportional to the cosine of an angle θ as measured from an observer's line of sight up to a surface normal, as depicted in FIG. 2A. While not bound by theory, the relationship between the ray emitting angle θ and the coordinates Q(x,y) of the profile according to FIG. 2A may be obtained as follows:

$$\beta = \sin^{-1}\left(\frac{\sin(\theta - \alpha)}{n}\right) + \alpha$$

$$\theta = \alpha + \sin^{-1}\left\{n \cdot \sin\left[\tan^{-1}\left(\frac{y - y_1}{x - x_1}\right) - \alpha\right]\right\}$$

where θ is the ray angle emitted from the LED chip center; β is the refractive angle to the normal at the point $P(x_1, y_1)$; α is the draft angle of the cylinder surface AP, which is the recessed cone surface through points A and P, and may range between 2° to 7°; η is the tangent angle of profile BQ at the point Q(x,y); t is the inclination angle between the reflective ray and the profile BQ at the point Q(x,y); and n is the refractive index of the lens material. As shown in FIG. 2B, x and y are the coordinates of the previous point on the profile BQ. The points $x_{next}$ and $y_{next}$, not shown in FIG. 2, are the coordinates of the next point on the profile BQ. The steps of x and y are dx and dy. The points $x_{next}$ and $y_{next}$ may be obtained as follows:

$$y_{next} = y + dy$$

$$x_{next} = x + dx = \frac{x + dy}{\tan\left(\frac{\pi}{4} + \frac{\beta}{2}\right)}$$

The collimating lens 30 may encompass the Lambertian LED 20, and may include a central aspheric lens. The term "central aspheric lens" means a lens or lens system that departs slightly from the spherical form and is configured for correcting spherical aberration from the central part of the light. An aspheric lens or asphere is a lens whose surfaces have a profile that is neither a portion of a sphere nor of a circular cylinder. The asphere's more complex surface profile may eliminate spherical aberration and may reduce other optical aberrations as compared to a simple sphere lens. The central aspheric lens may be configured for collimating a central part of the light emitted from the Lambertian LED 20 and minimizing the aberrations delivered. The central aspheric lens may resemble a cylinder with an indented end facing the Lambertian LED 20, although other shapes may also be envisioned to collimate light emitted from the Lambertian LED 20, such as a sphere or a semi-sphere. Examples of materials of the collimating lens 30 may include PMMA and polycarbonate.

The collimating surface 40 may encompass the collimating lens 30, and may include a total internal reflective (TIR) surface. The term "TIR surface" means a surface that enables total internal reflection. The term "total internal reflection" means when substantially all the light rays are reflected back from the surface at which they are incident, and where substantially none of the light rays has passed through the surface. Total internal reflection may be due to an optical phenomenon that occurs when a ray of light strikes a medium boundary at an angle larger than the critical angle with respect to the normal to the surface. If the refractive index is lower on the other side of the boundary no light can pass through, so effectively all of the light is reflected. The critical angle is the angle of incidence above which the total internal reflection occurs. The TIR surface may be configured for further collimating the remaining part of the light emitted from the Lambertian LED 20 that may have missed the collimating lens 30, and for directing the collimated light onto the corrugated surface 60.

The profile of the outside TIR surface BQ in FIG. 2A may be calculated by using the mathematical integral iteration method according to the above-described equations. The profile BQ may be calculated beginning from an initial point B. After stepped dx and dy, the angles θ and β may be calculated, and the coordinates of the next point may be calculated according to the above equations. A mathematically calculated profile of BQ is shown in FIG. 2B.

The collimating surface 40 may be conical, although other shapes may also be envisioned to further collimate the remaining part of the light that may have missed collimating lens 30. The light collimated by the collimating lens 30 and collimating surface 40 may be merged together and be incident onto the corrugated surface 60. Examples of materials of the collimating surface 40 include PMMA and polycarbonate.

Figure 3A:
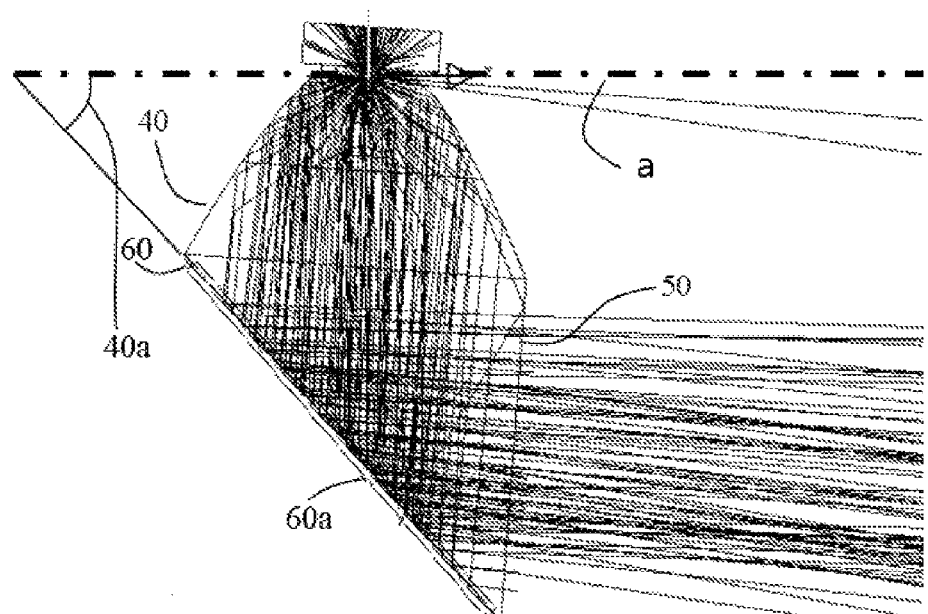
FIG. 3A depicts the side view of the fog lamp with light emission.
Figure 3B:
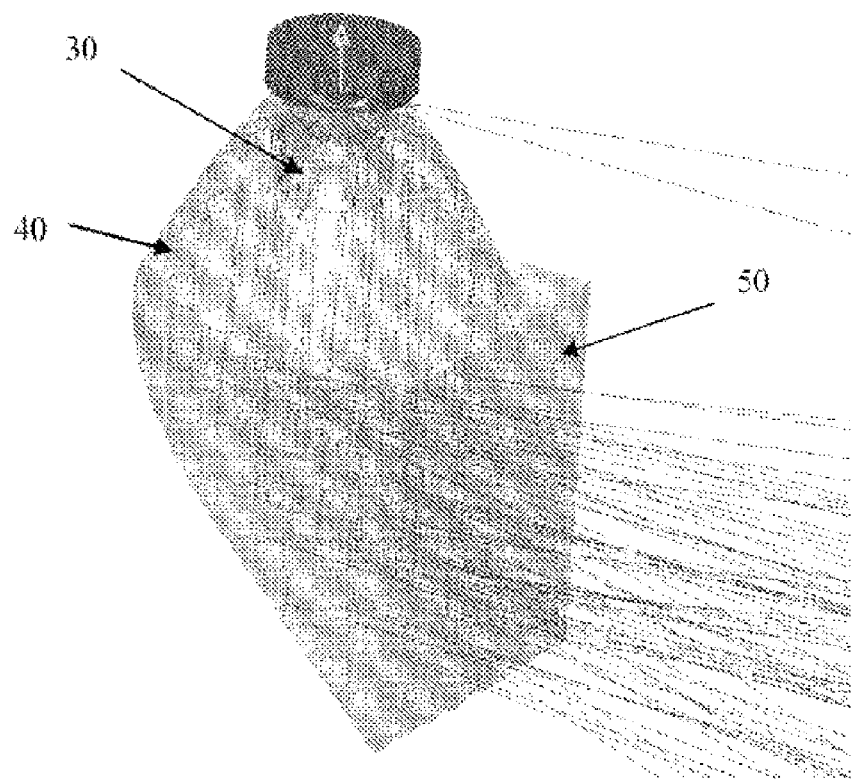
FIG. 3B depicts the front perspective view of the fog lamp with light emission.

The corrugated surface 60 may be attached to the collimating surface 40 at an acute angle 40a with respect to an optical axis a of the collimating surface 40, as depicted in FIG. 3A. The acute angle 40a may range from about 15° to 75°, or preferably from 40° to 50°. For example, the acute angle may be 45°. The corrugated surface 60 may include a cylindrical or a concaved surface. The corrugated surface 60 may also include a pillow lens array 60a. The pillow lens array may be configured for collecting the collimated light from the collimating lens 30 and the collimating surface 40, and re-directing the collimated light towards the output surface 50 and out of the fog lamp system 10, as depicted in FIGS. 3A and 3B. The pillow lens array 60a on the corrugated surface 60 may provide flexibility to the fog lamp system 10 for light re-distribution and for specified generation of a light pattern.

Each pillow lens may have a radius of curvature along the X plane in order to spread and re-distribute the reflected rays to form a long and flat light pattern at a far distance, as shown in FIG. 6. In one embodiment, each pillow lens may have a width of 2 millimeters and a radius of curvature of 4.9 millimeters, although other dimensions known to one of ordinary skill in the art may also be used. The pillow lens array may include a plurality of interconnected slates. Other types of lens arrays may also be envisioned to re-direct the collimated light. Examples of materials of the corrugated surface 60 include PMMA and polycarbonate.

Figure 8:
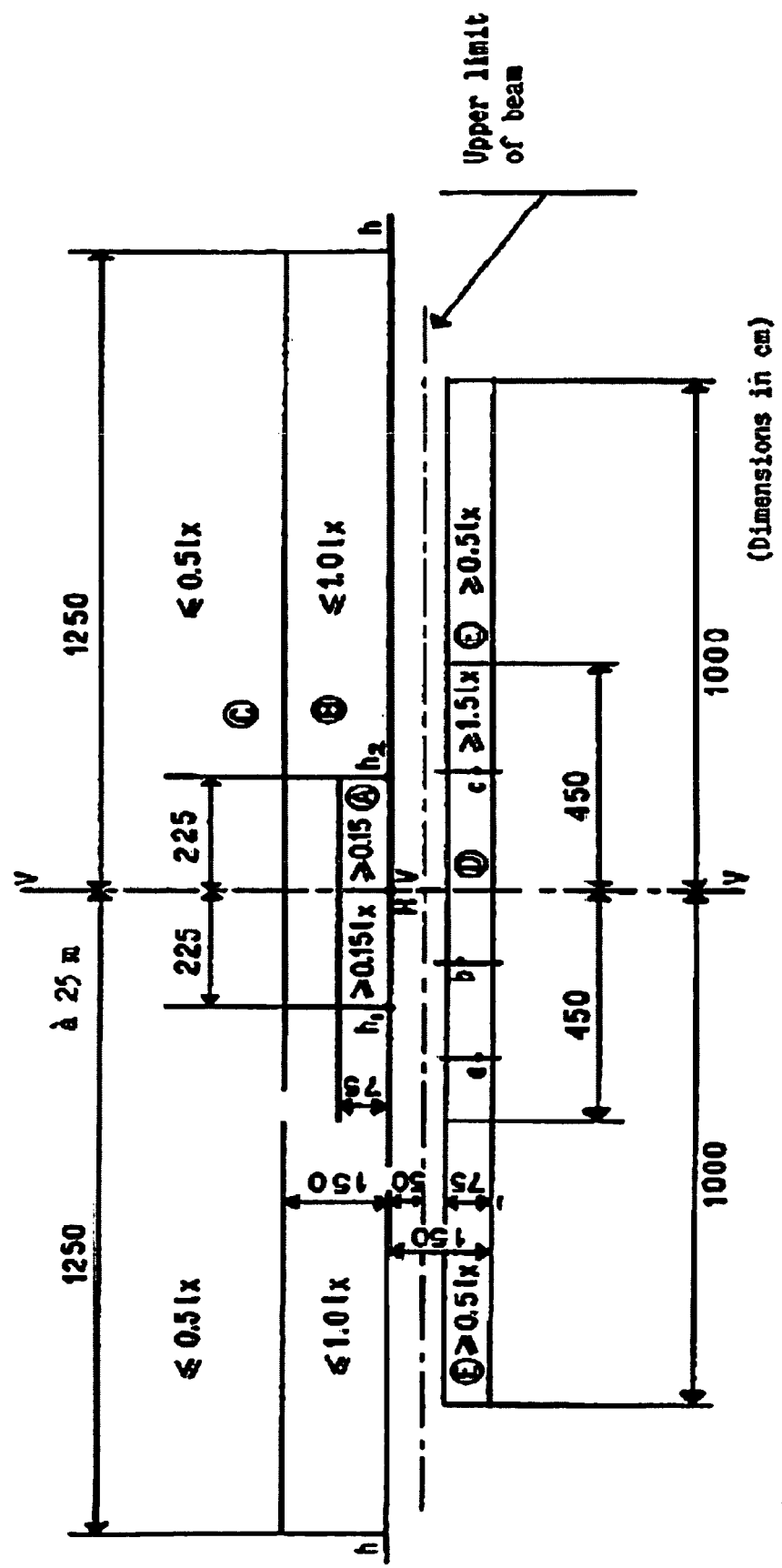
FIG. 8 depicts the light pattern requirement of the ECE (Economic Commission for Europe Inland Transport Committee) standard for the automotive front fog lamp, Regulation No. 19.

The output surface 50 may be connected to the collimating surface 40 and the corrugated surface 60. The output surface 50 may be configured to allow reflected light from the corrugated surface 60 to exit the fog lamp system 10. The output surface 50 may include a flat plane perpendicular to the direction of light propagation. Alternatively, the output surface 50 may have an acute angle that may be used to adjust the light pattern at a far distance below the horizontal line "h-h" in FIG. 8. Other variations of the components of fog lamp system 10 may be used to collect and redirect the collimated light from a halogen or other light source to create elongate light patterns that meet the standard as shown in FIG. 8.

The fog lamp system 10 may have a compact size of at most 20 millimeters in width and at most 35 millimeters in height. Other dimensions known to one of ordinary skill in the art may also be used. Moreover, a high output light efficiency may be achieved, as described in the Example 1.

A method of making the fog lamp system may include providing a Lambertian LED, encompassing the Lambertian LED with a collimating lens, encompassing the collimating lens with a collimating surface, and attaching a corrugated surface to the collimating surface at an acute angle with respect to an optic axis of the collimating surface.

A plurality of fog lamp systems 10 may be aligned together to form a fog lamp assembly. Mechanical mounting as known to one of ordinary skill in the art may be designed to hold the LEDs and lens modules together and to ensure proper alignment. For example, the fog lamp assembly may include seven individual fog lamp systems, as depicted in FIGS. 4A and 4B. Other numbers of fog lamps may also be chosen according to one of ordinary skill in the art. The fog lamp assembly in operation showing emitted light is depicted in FIGS. 5A through 5D. The assembly may be used as an automotive fog lamp.

Figure 7:
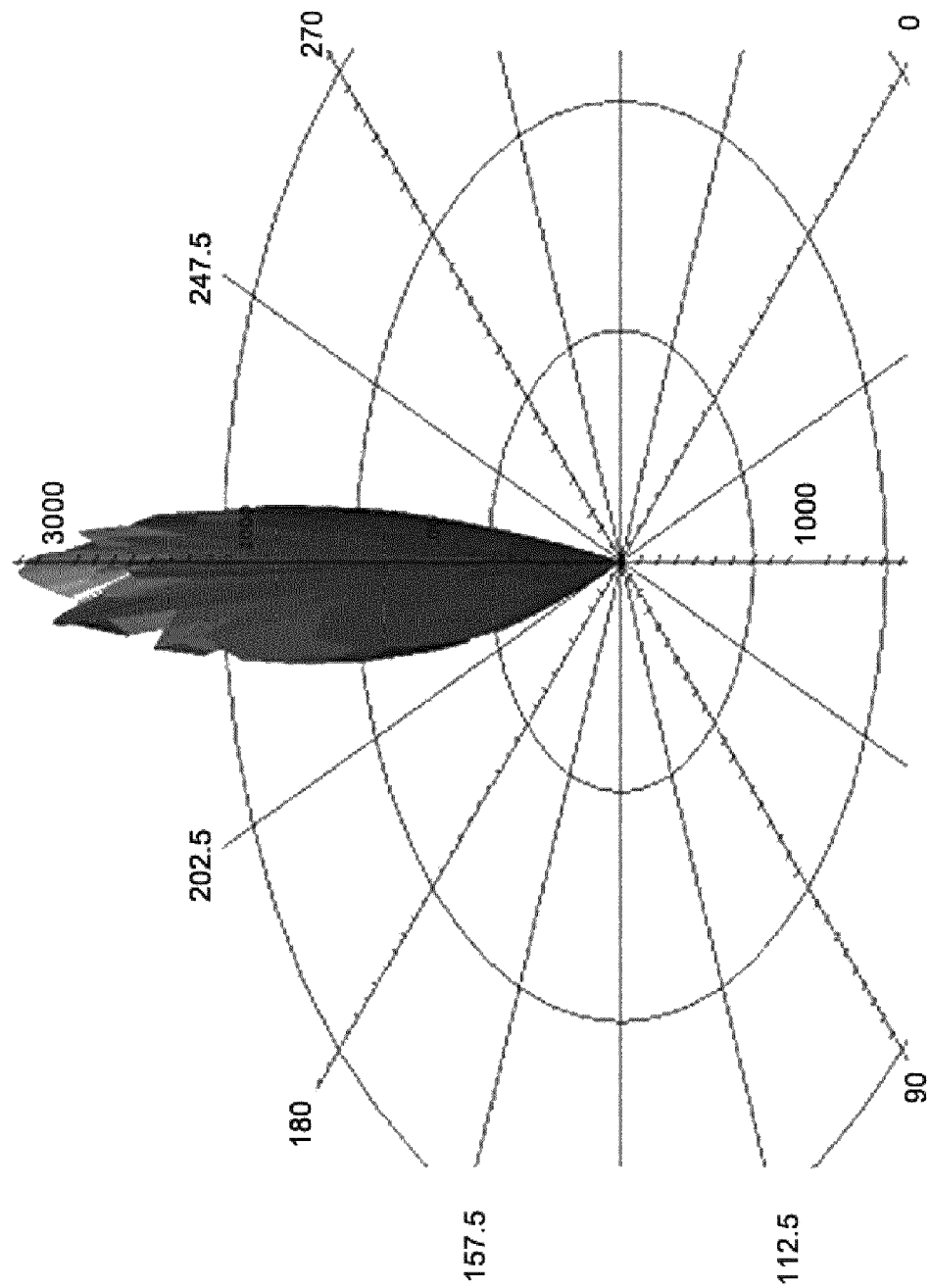
FIG. 7 depicts a far field angle distribution of the fog lamp.

A fog lamp assembly may have seven LEDs, where each LED has 40 to 50 lumens output flux. Such a fog lamp assembly may achieve the desired luminance requirement and may meet the ECE Regulation. Examples of such assemblies are described in Example 1 and Table 1. A 3D light intensity far field angle distribution of the fog lamp assembly is depicted in FIG. 7. This distribution demonstrated the distance at which the light from the fog lamp assembly can reach, as well as the distribution of light intensity along that distance.

Having described embodiments of the fog lamp with reference to the accompanying drawings, it is to be understood that the present fog lamp is not limited to the precise embodiments, and that various changes and modifications may be effected therein by one having ordinary skill in the art without departing from the scope or spirit as defined in the appended claims.

Furthermore, it should be understood that the fog lamp is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims.

EXAMPLE

Example 1

Luminance Simulation of the Fog Lamp in Satisfaction of ECE Regulation

A 3D model of the fog lamp was generated using software such as LightTools (available from Optical Research Associates, Pasadena, Calif., U.S.A.) to trace the light rays and to perform analyses on the performance of the fog lamp. A screen having a width of 25 meters and a height of 8 meters was placed 25 meters from a fog lamp to collect the light and to measure the luminance distribution. The screen center and the fog lamp center were both aligned on the same horizontal line.

In this example, seven LEDs with 42 lumen per LED were used. The total theoretical flux for the fog lamp was 294 lumens, whereas the actual collected flux on the screen was 212.2092 lumens. Consequently, the calculated luminance efficiency was 72.18%, and the maximum luminance was about 5.5 lux, as depicted in FIG. 6A.

Figure 6C:
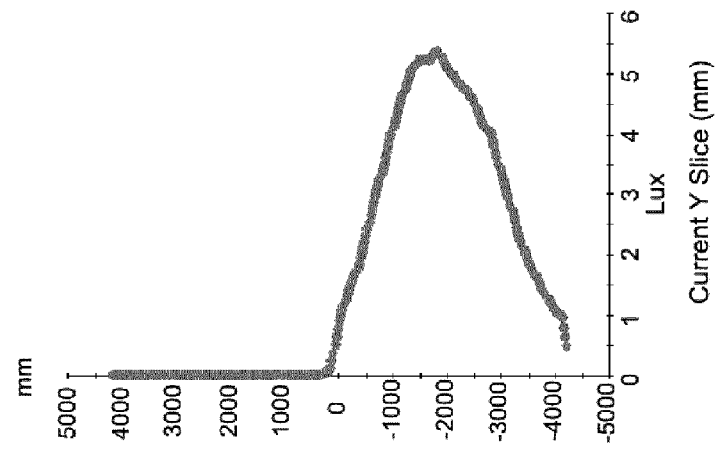
FIG. 6C depicts the luminance distribution of the light intensity pattern of FIG. 6A along the Y plane.
Figure 6A:
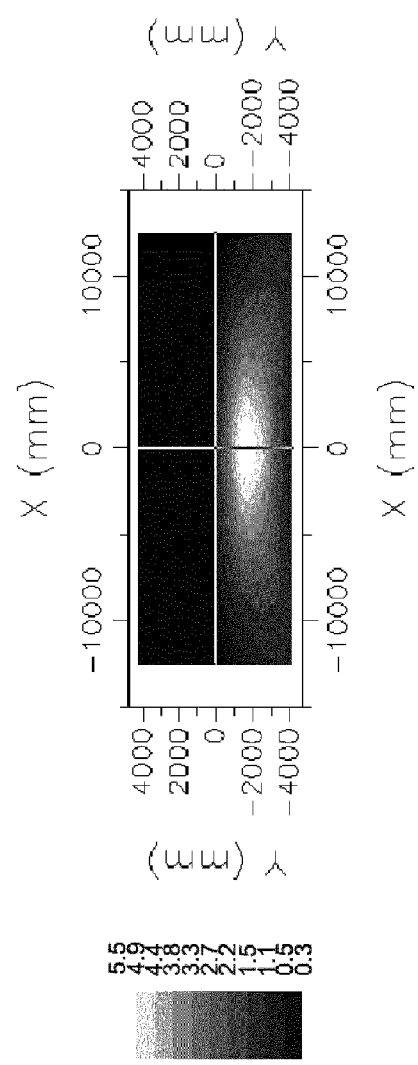
FIG. 6A depicts a light luminance distribution pattern of the fog lamp at 25 meters away.
Figure 6B:
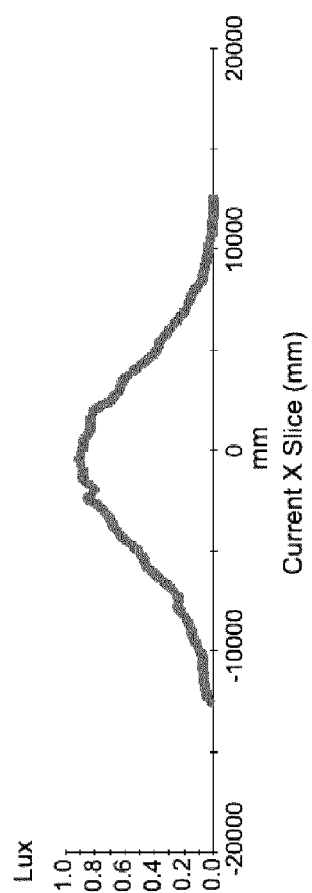
FIG. 6B depicts the luminance distribution of the light intensity pattern of FIG. 6A along the X plane.

The luminance distributions along the X plane and the Y plane of FIG. 6A were measured, as depicted in FIGS. 6B and 6C, respectively. The maximum luminance value along the X plane was no more than 0.1 lux, as shown in FIG. 6B. This value would meet the ECE Regulation as described in FIG. 8, which requires the luminance above the "h-h" line (A zone) to be ≦0.15 lux. The maximum luminance value along the Y plane was about 5.5 lux, as shown in FIG. 6C. This value would also meet the ECE Regulation as described in FIG. 8, which requires the luminance below the "h-h" line (D zone) to be ≧1.5 lux.

A summary of the fog lamp measurements is listed in Table 1 below. These measurements were compared with the ECE Regulations, also listed in Table 1. The data have suggested that the fog lamp measurements met all of the ECE Regulations for Zones A to E.

TABLE 1

The measurement of fog lamp in satisfaction of ECE Regulation

| Testing Zone (A to E) | Maximum ECE requirement (lux) | Minimum ECE requirement (lux) | Maximum luminance data as measured (lux) | Minimum luminance data as measured (lux) | Requirements met? |
|---|---|---|---|---|---|
| A | 1.0 | 0.15 | 0.835099 | 0.154137 | Yes |
| B | 1.0 | — | 0.389607 | 0 | Yes |
| C | 0.5 | — | 0.000305 | 0 | Yes |
| D | — | 1.5 | 3.772553 | 1.876787 | Yes |
| E | — | 0.5 | 2.142259 | 0.577772 | Yes |

While the examples of the fog lamp have been described, it should be understood that the fog lamp is not so limited and modifications may be made. The scope of the fog lamp is defined by the appended claims, and all devices that come within the meaning of the claims, either literally or by equivalence, are intended to be embraced therein.

We claim:

1. A fog lamp, comprising:
   a Lambertian LED;
   a collimating lens encompassing said Lambertian LED;
   a collimating surface comprising a total internal reflective surface and encompassing said collimating lens; and
   a corrugated surface attached to said collimating surface at an acute angle with respect to an optic axis of said collimating surface.

2. The fog lamp of claim 1, wherein said collimating lens comprises a central aspheric collimating lens.

3. The fog lamp of claim 1, wherein said corrugated surface comprises a pillow lens array.

4. The fog lamp of claim 3, wherein said pillow lens array comprises a plurality of interconnected slates.

5. The fog lamp of claim 3, wherein each pillow lens of said array comprises a width of at most 2 millimeters and a radius of curvature of at most 4.9 millimeters.

6. The fog lamp of claim 1, further comprising an output surface connected to said collimating surface and said corrugated surface.

7. The fog lamp of claim 1, wherein said Lambertian LED emits 40 to 50 lumens of flux.

8. The fog lamp of claim 1, wherein said acute angle is from 15° to 75°.

9. The fog lamp of claim 8, wherein said acute angle is from 40° to 50°.

10. The fog lamp of claim 1, further comprising a width of at most 20 millimeters and a height of at most 35 millimeters.

11. A fog lamp assembly, comprising seven of said fog lamps of claim 1 aligned together.

12. The fog lamp assembly of claim 11, further comprising a luminance efficiency of at least 72% at 25 meters away.

13. The fog lamp assembly of claim 11, further comprising a luminance value along an X plane of no more than 0.1 lux.

14. The fog lamp assembly of claim 11, further comprising a luminance value along a Y plane of at least 5.5 lux.

15. A method of making a fog lamp, comprising:
providing a Lambertian LED;
encompassing said Lambertian LED with a collimating lens;
encompassing said collimating lens with a collimating surface; and
attaching a corrugated surface to said collimating surface at an acute angle with respect to an optic axis of said collimating surface.

16. The method of claim 15, further comprising connecting an output surface to said collimating surface and said corrugated surface.

17. The method of claim 15, wherein said collimating lens comprises a central aspheric collimating lens.

18. The method of claim 15, wherein said corrugated surface comprises a pillow lens array.

19. The method of claim 15, wherein said acute angle is from 40° to 50°.

20. A method of making a fog lamp assembly, comprising:
making a plurality of fog lamps according to the method of claim 15, and
aligning seven of said fog lamps together.

* * * * *